United States Patent [19]
Danti et al.

[11] Patent Number: 4,752,652
[45] Date of Patent: Jun. 21, 1988

[54] ANTI-SHORT BUSHING

[75] Inventors: Bernard R. Danti, Lexington, Mass.; Joel A. Hamilton, Demarest, N.J.; David P. Williams, Billerica, Mass.; Paul W. Suprono, East Greenwich, R.I.

[73] Assignee: Nortek Corporation, Providence, R.I.

[21] Appl. No.: 903,402

[22] Filed: Sep. 3, 1986

[51] Int. Cl.$^4$ ............................................ H01B 17/58
[52] U.S. Cl. ............................................ 174/83; 16/2
[58] Field of Search ............... 174/83, 152 G, 153 G, 174/154, 155, 156, 167; 16/2

[56] References Cited

U.S. PATENT DOCUMENTS

| | | | |
|---|---|---|---|
| 1,742,488 | 1/1930 | Schneider et al. | 174/83 |
| 1,779,951 | 10/1930 | Schneider | 174/83 |
| 1,793,697 | 2/1931 | Johnson | 174/83 |
| 1,799,765 | 4/1931 | Schneider et al. | 174/83 |
| 1,801,549 | 4/1931 | Frederickson | 174/83 |
| 1,808,542 | 6/1931 | Ginsburg | 174/83 |
| 1,829,512 | 10/1931 | Frederickson | 174/83 |
| 1,842,216 | 1/1932 | Thomas, Jr. | 174/83 X |
| 1,857,197 | 5/1932 | Knoederer | 174/83 X |
| 2,209,274 | 7/1940 | Jaberg | 174/83 |
| 2,245,422 | 6/1941 | Whittaker | 174/83 X |
| 2,246,124 | 6/1941 | Carlson | 174/83 X |
| 2,249,593 | 7/1941 | Badeau | 174/83 |
| 2,268,060 | 12/1941 | Rhode | 174/83 |
| 2,563,604 | 8/1951 | Hultgren | 174/153 G |
| 3,056,852 | 10/1962 | Sachs | 174/153 G |
| 3,133,147 | 5/1964 | Auld, Jr. et al. | 174/154 |
| 3,643,290 | 2/1979 | Milne | 16/2 |
| 3,836,698 | 9/1974 | Bawa | 174/83 |
| 3,889,909 | 6/1975 | Koscik | 174/153 G X |
| 4,233,469 | 11/1980 | Steppe | 174/83 |
| 4,289,923 | 9/1981 | Ebert | 174/153 G |
| 4,535,196 | 8/1985 | Milne | 174/83 |

Primary Examiner—Laramie E. Askin

[57] ABSTRACT

An anti-short bushing, for use between a tubular metal sheath and an electrical conductor carried within the metal sheath, comprising a tubular insulative unit configured to be inserted between the sheath and the conductor. The tubular insulative unit is formed as a single molded piece having three connected segments. Two of the segments are generally semi-cylindrical and each has a shoulder projecting radially therefrom at one end. The two segments are connected by an elongated hinge which permits them to be folded relative to one another to form a tubular configuration with their shoulders forming a partial circumferential shoulder. The third segment is connected to the elongated hinge by a second hinge to permit the third segment to be rotated to project radially outwardly so as to form with the two shoulders of the other two segments a complete circumferential shoulder.

5 Claims, 4 Drawing Sheets

ANTI-SHORT BUSHING

BACKGROUND OF THE INVENTION

This invention relates to anti-short bushings.

One common type of anti-short bushing, called a "red head", is a plastic piece that can be slipped into the open end of a flexible armored cable between the spirally wound metal sheath and the wires carried within the sheath, to prevent shorting.

Red heads typically are formed either as one piece or as two separate pieces that must both be inserted into the end of the cable. It is known to provide red heads with ridges, barbs, or other projections to resist the removal of the red head, once inserted.

SUMMARY OF THE INVENTION

One general feature of the invention is an anti-short bushing for use between a tubular metal sheath and an electrical conductor carried within the metal sheath, comprising a tubular insulative unit configured to be inserted between the sheath and the conductor; the tubular insulative unit has a single molded piece with at least two connected segments that can be moved relative to one another to positions in which the unit can be inserted.

Preferred embodiments include the following features. The single molded piece has a hinge means for connecting the two segments. The tubular insulative unit has a shoulder that projects outwardly from the unit near one end of the unit, and lies against the end of the metal sheath when inserted. The shoulder includes two subshoulders each attached to one of the segments, and a separate flap that is part of the single molded piece. The unit bears at least one dimple projecting from an outer wall of the unit for retaining the bushing in the sheath. There are a plurality of the dimples at different distances from the shoulder. The sheath is a spiral metal casing having a spiral groove in its interior wall and the differences in the distances allow the dimples to rest within the groove at different positions along the sheath. Each dimple has a contour that permits relatively easier insertion than withdrawal of the bushing.

Another general feature of the invention is an integrally molded piece having two sections each with an inner concave surface, an outer convex surface, and a shoulder at one end projecting from the convex surface away from the concave surface, the sections being connected by a hinge means that permits the sections to be rotated to positions where they form a tubular unit with the shoulders located near one end of the unit and surrounding the unit except for a gap, and a flap rotatable to a location within the gap.

Another general feature of the invention is a molded piece having two such sections, and a projection on one convex surface projecting away from the concave surface and spaced away from the shoulders.

Another general feature of the invention is a molded piece having two such sections, contoured to be insertable into an armored cable between an outer metal sheath of the cable and electrical wires within the cable.

In preferred embodiments, the hinge means has two longitudinal parallel grooves separated by a hinge strip.

Another general feature of the invention is a method of installing an anti-short bushing on a flexible armored cable comprising providing an integrally molded piece having two sections connected by a hinge, folding the piece at the hinge to form the bushing, and inserting the bushing into the armored cable.

The bushing is formed from a single piece that can be cast in a simple (non-side-action) mold and is thus inexpensive to make. It is easily inserted with one hand into an armored cable and, even though it resists accidental removal, can be removed if required. It can be inserted into the armored cable by folding it around the wires without disconnecting them.

Other features and advantages of the invention will be apparent from the following description of the preferred embodiments, and from the claims.

DESCRIPTION OF THE PREFERRED EMBODIMENT

The drawings will first briefly be described.

Drawings

Figure 4:
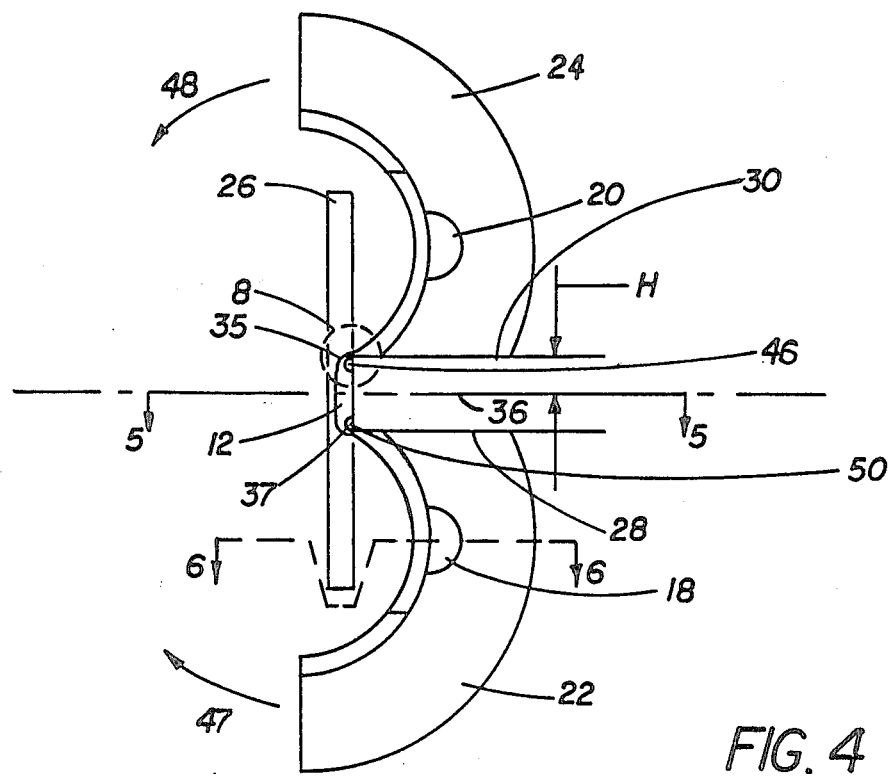
Figure 5:
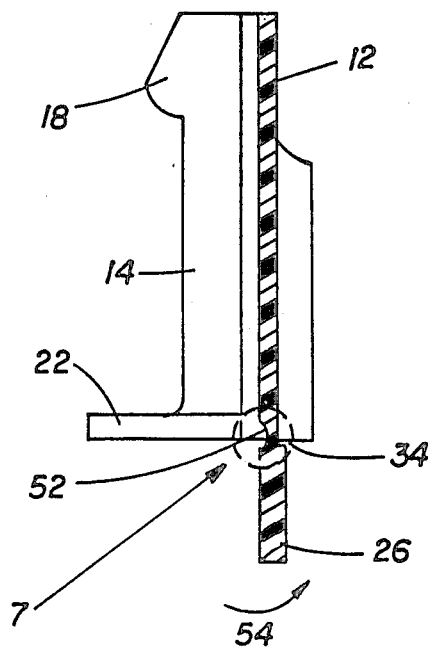
FIGS. 5 and 6 are sections of the anti-short bushing, respectively at 5—5 and 6—6 in FIG. 4.
Figure 7:
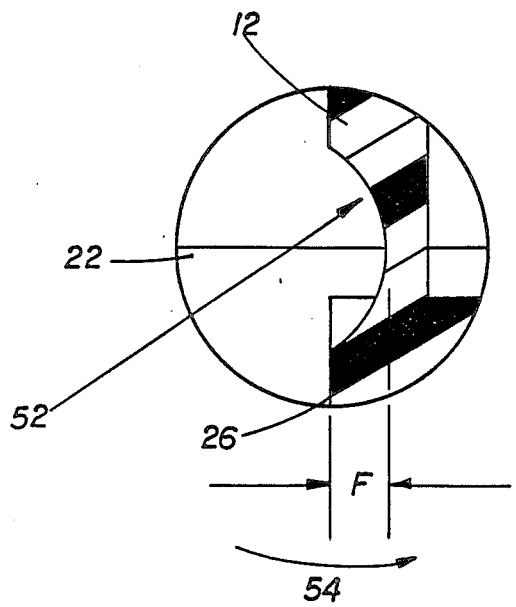
Figure 8:
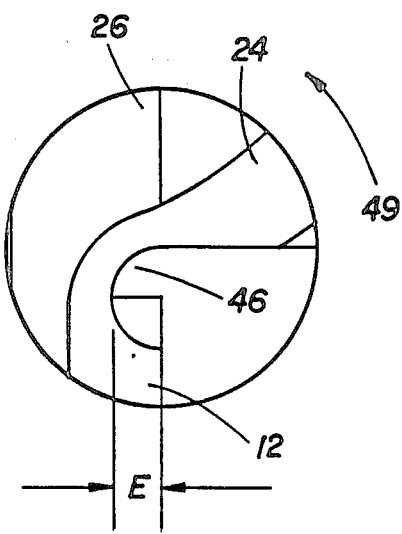

FIGS. 7 and 8 are enlarged views, respectively, of portions 7, 8 of FIGS. 5 and 4.

STRUCTURE AND MANUFACTURE

Figure 1:
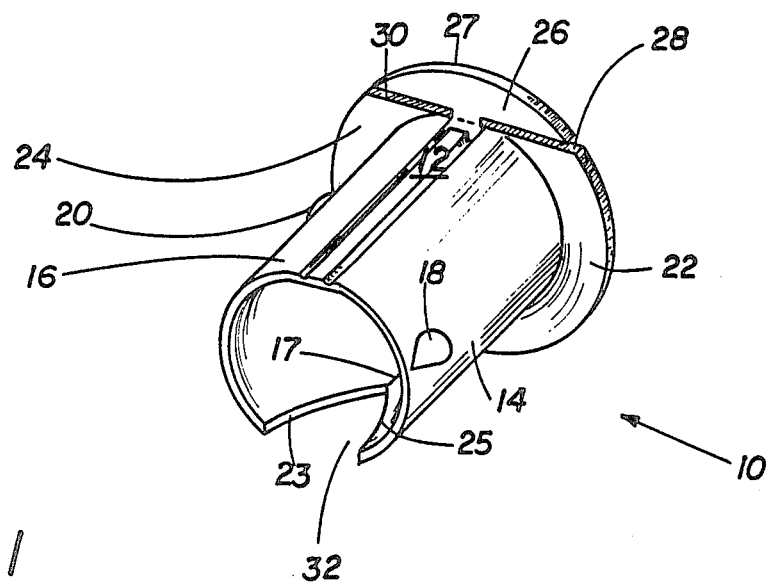
FIG. 1 is an isometric view of an anti-short bushing, ready for use.

Referring to FIG. 1, an anti-short bushing 10 has a hinge strip 12 connecting two half sleeves 14, 16. Half sleeves 14, 16 touch (but are not connected) along a common line 17 and have projecting dimples 18, 20 and shoulders 22, 24. Shoulders 22, 24 do not fully surround the anti-short bushing but end at straight edges 28, 30. The gap between edges 28, 30 is occupied by a flap 26 attached to the end of hinge strip 12. Flap 26 has an outer edge 27 that has a circular contour with the same diameter (about 0.562″) as the circularly contoured outer edges of shoulders 22, 24. Half sleeves 14, 16 together form a hollow cylinder (inner wall diameter about 0.28″) having a cutout 32 formed by edges 23, 25.

Figure 2:
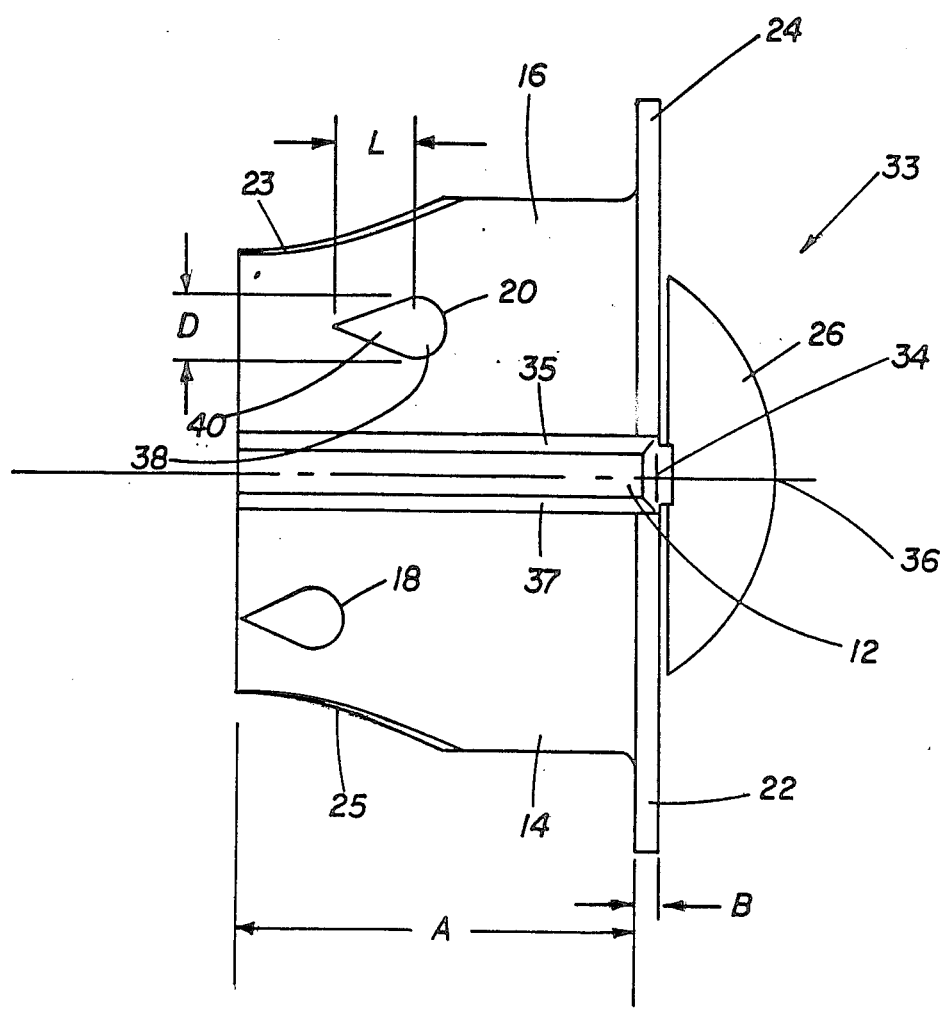
FIGS. 2 and 4 are plan and end views, respectively, of a molded piece from which the anti-short bushing is formed.

Referring to FIG. 2, in molded piece 33, flap 26 is attached by a flexible neck 34 to hinge strip 12, and can be pivoted about neck 34. Half sleeves 14, 16 have length A, about 0.5″, and are attached along (and can pivot about) hinges 35, 37 of hinge strip 12. Shoulders 22, 24 have a thickness B of about 0.03″.

Dimples 18, 20 are pear-shaped, being composed (in cross section) of a half circle 38 and a triangle 40. The diameter D of circle 38 is about 0.08″, and the length L of triangle 40 is about 0.09″. Dimple 20 is positioned about 0.30″ from the shoulder end of molded piece 33; dimple 18 is about 0.42″ from the shoulder end.

Figure 3:
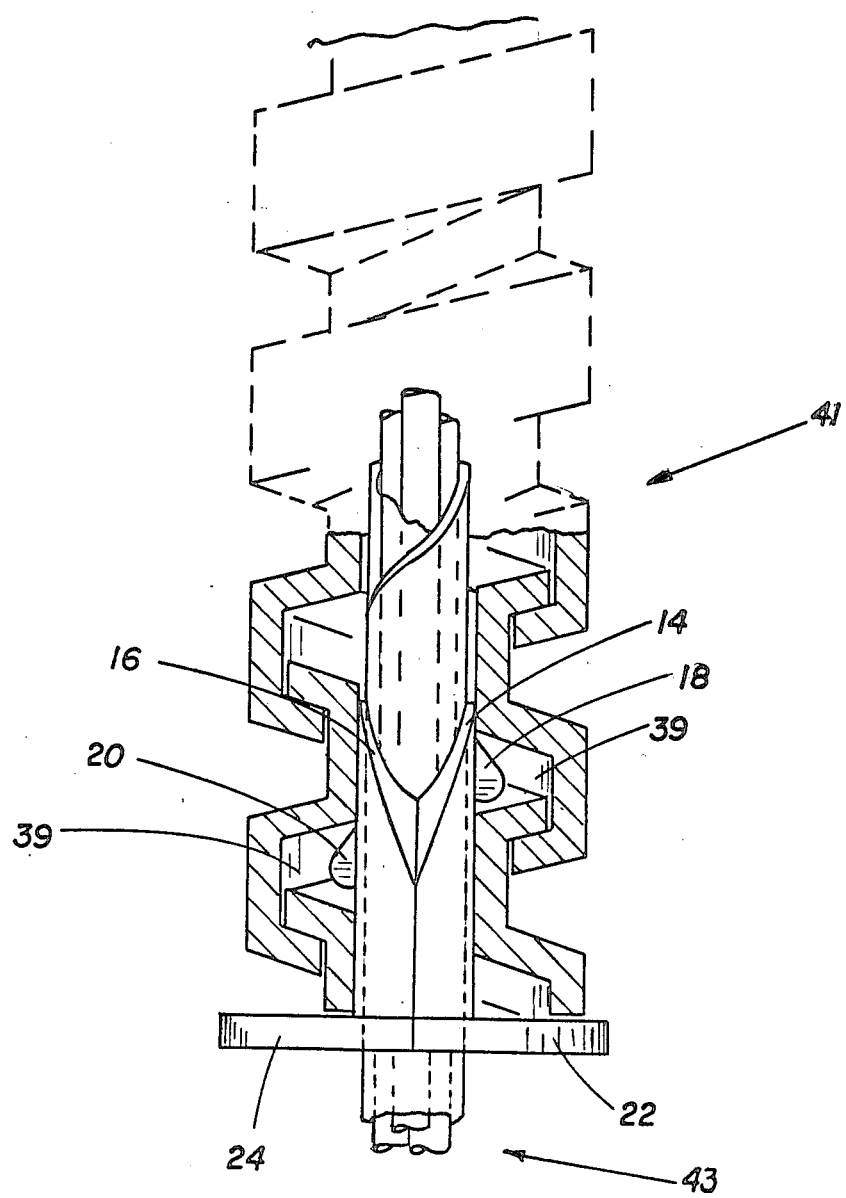
FIG. 3 is a partial section of an armored cable holding an anti-short bushing.

Thus, referring to FIG. 3, the distance, C, between the dimples 18, 20 is about 0.012″ along the length of the half sleeves, corresponding to the spacing of the grooves 39 within the inner wall of the sheath of an armored cable 41.

Referring to FIGS. 4 and 8, hinges 35, 37 are defined, respectively, by grooves 46, 50. Each groove 46, 50 allows rotation of its associated shoulder 22, 24 about hinge strip 12 as shown by arrows 47, 48 and 49 to form the bushing 10 of FIG. 1. Distance H, from the mid-axis 36 to edge 28 is about 0.047", and the depth of groove 46 (E) is about 0.010".

Referring to FIGS. 5 and 7 neck 34 has a groove 52, whose depth, F, is about 0.012", and is sufficient to allow rotation of flap 26 about hinge 12 as shown by arrow 54.

Figure 6:
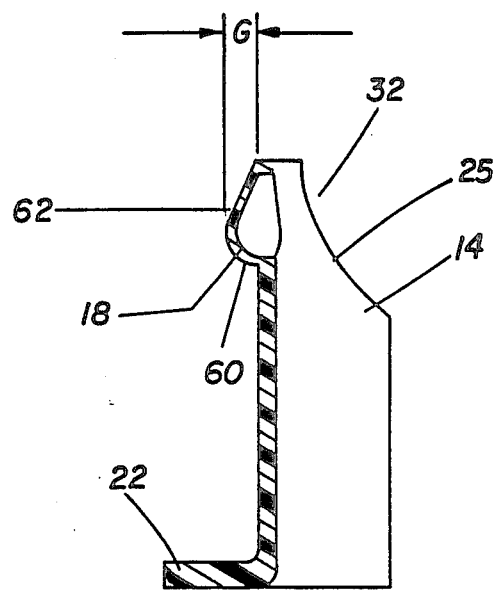

Referring to FIG. 6, dimple 18 has a depth, G, of about 0.04" and has a hollowed interior.

Molded piece 33 is blow molded from polypropylene, with a wall thickness of about 0.02", by injecting molten plastic into a suitable non-side action mold, and allowing it to harden. In order to permit forming anti-short bushing 10 from a single molded piece 33, it is necessary for the outer edges of shoulders 22, 24 to be incomplete half circles (FIGS. 1 and 4), and preferably to have flap 26 to complete the shoulder.

Use

After removing piece 33 from the mold, half sleeves 14, 16 are rotated together (arrows 47, 48, FIG. 4), around electrical wires 43 (FIG. 3) projecting from armored cable 41. Flap 26 is then rotated (arrow 54, FIG. 5) so that it lies in the same plane as, and between, shoulders 22, 24, thus forming anti-short bushing 10 (FIG. 1). Bushing 10 is inserted into the armored cable between the wires and the sheath by pushing on shoulders 22, 24 and directing the cutout (32) end into the cable first. Cutout 32 makes it easier to insert anti-short bushing. When dimples 18, 20 enter the armored cable, extra force is needed to push them into the cable, because half sleeves 14, 16 meet along edge 17, thus resisting the movement of the dimples toward the axis of the cable. Once inside the cable the dimples are held within groove 39 in the cable and reduce the chance of accidental removal of the anti-short bushing 10. The pear-shape of the dimple includes a rounded edge 60 (FIG. 6) which allows removal of the bushing, but the removal force is greater than the insertion force because of the relative shallow shape 62 on the lower sides of the dimples. The positioning of the dimples with respect to the grooves in the cable allows both dimples to hold the anti-short bushing in its desired location. Further, since the dimples are not in the same plane in the anti-short bushing, insertion of the bushing is relatively easy. Once inserted, shoulders 22, 24 and flap 26 lie against the end of the armored cable, covering it, and preventing abrasion of the electrical wires.

Other embodiments are within the following claims. For example, flap 26 can be made larger so as to extend beyond the diameter of shoulders 22, 24.

We claim:

1. An anti-short bushing for insertion between a tubular metal sheath and an electrical conductor carried within said metal sheath comprising, a generally tubular insulative unit having a body configured to be inserted between said sheath and said conductor, and a shoulder that projects radially outward from one end of said body of said unit to lie over the end of said sheath, said body and said shoulder comprising a single molded piece having three segments, two of said segments being generally semi-cylindrical and connected by an elongated hinge permitting them to be folded relative to one another to form said body and only a portion of said shoulder, a third said segment connected by a second hinge to said elongated hinge to permit said third segment to be rotated to project radially outward from said body to enable said third segment to substantially complete said outwardly projecting shoulder.

2. The anti-short busing of claim 1 wherein said unit bears at least one dimple projecting from an outer wall of said body for retaining said bushing in said sheath.

3. The anti-short bushing of claim 2 wherein said unit bears a plurality of dimples including said one dimple, and said dimples lie at different distances from said shoulder.

4. The anti-short bushing of claim 3 adapted for use with a said sheath having a spiral metal casing with a spiral groove in its interior wall and differences in said distances allow said dimples to rest within said groove at different positions along said sheath.

5. The anti-short bushing of claim 2 wherein each said dimple has a contour that permits relatively easier insertion than withdrawal of said bushing.

* * * * *